July 21, 1964   R. N. ABILD   3,141,383
DRUM SERVO CONTROL VALVE
Filed May 8, 1961
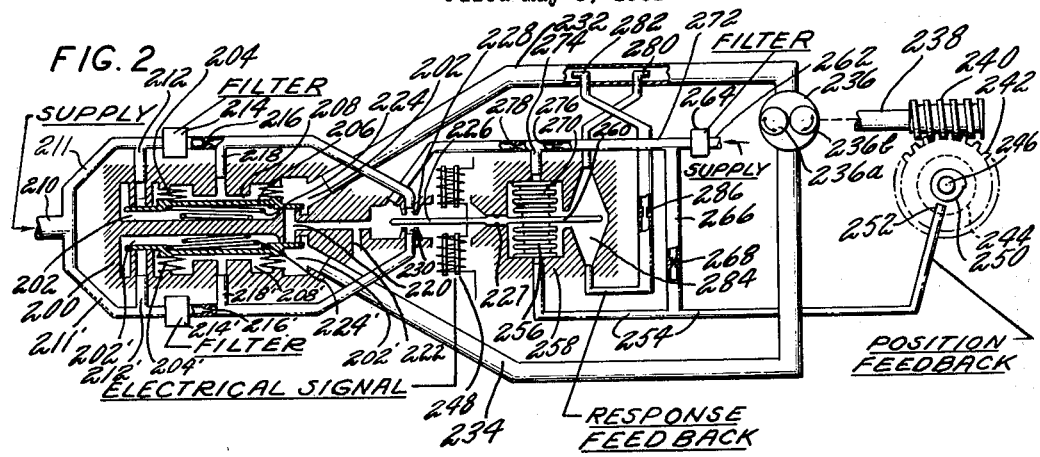
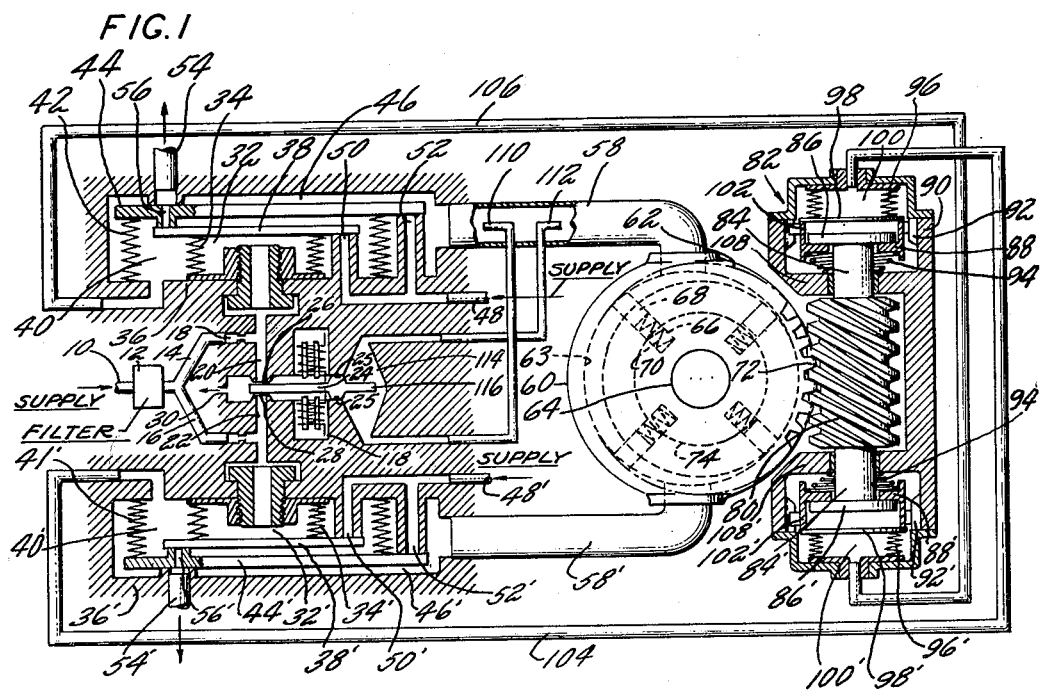
INVENTOR
ROBERT N. ABILD
BY David S. Fishman
AGENT

United States Patent Office 3,141,383
Patented July 21, 1964

3,141,383
DRUM SERVO CONTROL VALVE
Robert N. Abild, New Britain, Conn., assignor to United Aircraft Corporation, East Hartford, Conn., a corporation of Delaware
Filed May 8, 1961, Ser. No. 111,124
7 Claims. (Cl. 91—45)

This invention relates to a servo system for actuating moveable elements. More particularly it relates to a pneumatic servo system having fast response, high gain, inherent stability, and lack of much of the springiness usually associated with pneumatic systems.

The invention is contemplated for use in connection with the control drums of a nuclear reactor in which locking means are provided for preventing undesired movement of the control drums. The operating characteristics of a nuclear reactor require close control over the reactor drums so that the drums can be moved swiftly to be placed in a desired position without exceeding the desired position. Furthermore, it is desirable to insure that external forces acting on the drums will not cause any uncontrolled movement of the drums.

Accordingly, one feature of the present invention is a novel servo system incorporating a positive position lock for the output member.

Another feature of the present invention is a novel servo system incorporating a positive position lock for the servo motor output and in which actuation of the servo system releases the lock.

Still another feature of the present invention is a pneumatic servo system incorporating a novel feedback responsive to flow in the system.

Still another feature of the present invention is a novel servo system in which a feedback function is inherently incorporated in the valves of the system.

Other features and advantages will be apparent from the specification and claims, and from the accompanying drawings which illustrate an embodiment of the invention.

FIG. 1 is a schematic representation of the servo system of the present invention.

FIG. 2 is a schematic representation of a modification of the servo system of the present invention.

Referring to FIG. 1, a pneumatic pressure supply is delivered through a conduit 10, a filter 12 and branch conduits 14 and 16, each of which has a fixed restriction 18 therein, to conduits 20 and 22. A flapper 24 which is pivoted at 25 determines the area of orifice 26 in conduit 20 and the area of orifice 28 in conduit 22. An overboard vent 30 communicates with orifices 26 and 28, and thus flapper 24 regulates the pressure levels in conduits 20 and 22.

Conduit 20 leads to a chamber 32 which is formed by a bellows 34 one end of which is fixed to housing 36 and the free end of which is attached to plate 38. Bellows 34 and plate 38 are in turn located in a chamber 40 which is formed by a bellows 42 one end of which is attached to housing 36 and the free end of which is attached to plate 44. Bellows 42 and plate 44 are in turn located in chamber 46 within housing 36. A pressure supply conduit 48 communicates from a source substantially the same as for conduit 10 with chamber 40 via branch conduit 50 and with chamber 46 via branch conduit 52. Plate 38 normally closes off conduit 50 from chamber 40 and plate 44 likewise normally closes off conduit 52 from chamber 46. A vent conduit 54 is also connected to chamber 46 and to chamber 40 via opening 56 in plate 44. Plate 44 normally closes off conduit 54 from chamber 46 and plate 38 normally closes off opening 56 from chamber 40.

A duplicate of the bellows, plate and chamber structure just described is also associated with conduit 22. The parts of this duplicate structure corresponding to the structure described immediately above are designated by the same reference numerals with a prime superscript added.

A conduit 58 leads from chamber 46 to one end of vane motor housing 60, and a conduit 58' leads from chamber 46' to the opposite side of housing 60. Housing 60 contains a vane motor which includes a disc 62 which is rotatably mounted in housing 60 on shaft 64. Disc 62 is eccentrically mounted within housing 60, and disc 62 has a plurality of slots 66 therein. The eccentricity between housing 60 and disc 62 leaves a substantial opening and flow path 63 connecting conduits 58 and 58'. Vanes 68 are slidably mounted in slots 66 and springs 70 in the base of slots 66 urge vanes 68 against the inner surface of housing 60. Thus it can be seen that as disc 62 rotates, the vanes 68 move in slots 66 in a generally radial direction to maintain contact with the inner surface of housing 60 without causing any binding of the vane motor. Shaft 64 extends outside of housing 60 and a gear 72 is mounted on shaft 64 outside of housing 60. An element to be driven by the vane motor such as a control drum 74 of a nuclear reactor is also mounted on shaft 64.

Gear teeth 72 contact worm 80 of locking mechanism 82. Worm 80 and gear 72 are of the large helix angle, high efficiency reversible drive variety so that gear 72 can drive worm 80. A shaft 84 extends from worm 80 and has a disc 86 fixedly mounted thereon. A friction clutch 88 is splined to housing 90 at 92, and spring 94 normally holds clutch 88 in contact with disc 86 to prevent rotation of worm 80. A bellows 96, one end of which is attached to housing 90 and the free end of which is attached to a plate 98 forms a chamber 100 within locking mechanism 82. Plate 98 contacts flange 102 on clutch 88 so that clutch 88 can be disengaged from disc 86 when chamber 100 is pressurized.

The above-identified locking mechanism structure is duplicated at the other end of worm 80, and like parts are identified by the same reference numerals with a prime superscript added.

Chamber 100 is connected to chamber 40' by conduit 104, and chamber 100' is connected to chamber 40 by conduit 106. A clearance exists at both ends of worm 80 between the worm and the collars 108 and 108' of housing 90 so that a slight axial movement of worm 80 will occur when the vane motor and gear 72 are rotated and worm 80 is given an axial thrust.

A flow response feedback mechanism is incorporated in the servo system and consists of conduit probes 110 and 112 positioned in conduit 58. Conduits 110 and 112 both lead to chamber 114 and hence a complete flow circuit is established. An extension 116 of flapper 24 is located in chamber 114, and flow through chamber 114 imposes a load on extension 116 which tends to cause flapper 24 to move about pivot 25 in a feedback manner to be described hereinafter.

*Operation of FIG. 1*

In the operation of the structure shown in FIG. 1 flapper 24 will ordinarily be in a null position, and the pressure is conduits 20 and 22, and chambers 32, 40, 46, 32', 40' and 46' will be at some intermediate value between the level of the supply pressure to conduits 48 and 10 and the vents 54 and 54'. There will be no flow in conduits 58 and 58' through the vane motor and hence there will be no force across the vane motor tending to rotate it. Springs 94 and 94' will hold clutches 88 and 88' in engagement with discs 86 and 86' to lock worm 80 and gear 72 in position thus preventing any movement of control drum 74.

An electrical signal which, for example, can be a signal indicative of the amount of a desired change in the programmed position for control drum 74 in the nuclear reactor, or which may be indicative of the size of an error in the temperature level in the reactor when the temperature deviates from the desired level, is delivered to electromagnet or torque motor 118. This signal will cause flapper 24 to move about pivot 25 in a clockwise or counterclockwise direction depending on the nature of the signal.

Assuming the flapper 24 is rotated in a clockwise direction, the area of orifice 26 will be decreased thereby increasing the pressure in conduit 20 and the area of orifice 28 will be increased thereby decreasing the pressure in conduit 22. The pressure in chamber 32 will be increased and plate 38 will be caused to pivot in a counterclockwise direction about its contact with opening 56 to open conduit 50 to chamber 40. The pressure in chamber 40 will start to increase and will continue to increase until it equals the pressure in chamber 32. It should be observed that the increasing pressure in chamber 40 tends to urge plate 38 to pivot in a clockwise direction about its contact with opening 56 to close off conduit 50 from chamber 40. Thus an immediate feedback is present tending to restore plate 38 to its original position by the flow resultant on its being displaced from its original position.

The increased pressure in chamber 40 acts on plate 44 and causes plate 44 to rotate in a counterclockwise direction about its contact with conduit 54 thereby opening chamber 46 to the pressure supply in conduit 52. In the manner described above, the increasing pressure in chamber 46 produces a feedback effect tending to close off conduit 52 from chamber 46. Both of these immediate feedback effects produce a servo system having fast response and inherent stability.

At the same time that the above-described results are occurring the reduced pressure in conduit 22 causes a reduction in pressure in chamber 32'. The reduction of pressure in chamber 32' results in plate 38' being rotated in a clockwise direction about its contact with condiut 50' thereby opening vent 54' to chamber 40' via opening 56' to reduce the pressure in chamber 40'. Once again it should be observed that the reduction of pressure in chamber 40' has an immediate feedback effect tending to cause plate 38' to be rotated in a counterclockwise direction about its contact with conduit 50' to close the connection between chamber 40' and vent 54'. The reduction of pressure in chamber 40' results in plate 44' being rotated in a clockwise direction about its contact with conduit 52' thereby connecting chamber 46' with vent 54' to reduce the pressure in 46'. Once again, the immediate feedback effect occurs tending to restore plate 44' to its original position so that both sides of the servo system posses the qualities of fast response and inherent stability.

The increase in pressure in chamber 46 and the simultaneous decrease in pressure in chamber 46' causes a fluid flow from chamber 46, through conduit 58, through opening 63 and through conduit 58' to vented chamber 46'. The flow through opening 63 creates a pressure differential across the vanes 68 extending into opening 63 and hence a force is produced tending to rotate disc 62, gear 72 and control drum 74 in a counterclockwise direction. The counterclockwise torque on gear 72 is transmitted to worm 80 and worm 80 is translated slightly upward in an axial direction due to the clearance between worm 80 and collar 108. The components of the locking mechanism 82 are dimensioned so that the permissible upward travel of spline 92 is less than the upward axial movement of worm 80. Therefore, the upward axial movement of worm 80 disengages disc 86 from clutch 88. At the same time the increased pressure in chamber 40 is transmitted via conduit 106 to chamber 100'. The increased pressure in chamber 100' expands bellows 96', and plate 98' in contact with flange 102' moves clutch 88' in an upward direction against spring 94' to disengage clutch 88' from disc 86'. Thus, both clutch 88 and clutch 88' are disengaged and gear 72 and worm 80 are free to turn so that control drum 74 is rotated to its desired position.

When fluid is flowing from chamber 46 to vent 54' via conduit 58, passage 63, conduit 58' and chamber 46' the feedback mechanism associated with extension 116 of flapper 24 becomes operative. At this time conduit probe 110 senses total pressure in conduit 58 and conduit probe 112 senses static pressure in conduit 58, and the difference between these pressures establishes a flow through chamber 114 which imposes a load on extension 116 tending to restore flapper 24 to its null position. Thus another immediate feedback signal which is responsive to flow in the system is incorporated in the servo system.

As the intended motion of control drum 74 is completed the electrical signal to torque motor 118 is eliminated and flapper 24 returns to its null position to equalize the pressure in conduits 20 and 22. Pressures in chambers 32, 40 and 46 and in chambers 32', 40' and 46' become equalized and the plates 38, 44, 38', and 44' return to their null position. Flow through conduit 58, passage 63 and conduit 58' then ceases and the pressure in all of the chambers once again assumes some intermediate value between the supply pressure and the vent pressure. The rotation of vane motor 62 then ceases and springs 94 and 94' return clutches 88 and 88' into locking engagement with discs 86 and 86' to prevent any undesired rotation of the worm and gear.

The above-described positive unlocking and locking of worm 80 at the beginning and end of the operation of the vane motor effectively eliminates the springiness and delay in response of the vane motor to input signal usually associated with pneumatic systems.

The above description of the operation of FIG. 1 was based on the assumption that flapper 24 had been rotated by electromagnet 118 in a clockwise direction. It will be apparent that if flapper 24 is actuated by electromagnet 118 so that flapper 24 is rotated in a counterclockwise direction about pivot 25, the operation of the servo system will be reversed. The pressure in chambers 32', 40' and 46' will be increased while the pressure in chambers 32, 40 and 46 will be decreased so that a flow will be established from chamber 46' through conduit 58', passage 63, conduit 58 and chamber 46 to vent 54. A load will thus be imposed on the vanes extending across passage 63 to create a clockwise torque on disc 62 and gear 72 thereby moving worm 80 downwardly in an axial direction to disengage disc 86 from clutch 88'. Simultaneously, the increased pressure in chamber 40' will be transmitted to chamber 100 to expand bellows 96 thereby causing plate 98 to move clutch 88 against spring 94 to disengage clutch 88 from disc 86 to free the vane motor so that control drum 74 can be rotated in a clockwise direction. The inherent feedback action of plates 38, 44, 38' and 44' will again occur as previously described as will the flow response feedback acting on extension 116 of flapper 24. However, this time conduit probe 112 will sense total pressure in conduit 58 and conduit probe 110 will sense static pressure in conduit 58 so that the flow through the conduit probes and chamber 114 will load extension 116 in a direction to cause flapper 24 to pivot in a clockwise direction about pivot 25 to move the flapper toward the null position. Similarly, as in the manner described above, as plates 38', 44', 38 and 44 and flapper 24 are returned to their null positions flow from chamber 46' through conduit 58', passage 63, conduit 58 and chamber 46 to vent 54 will cease and the pressures in the chambers will again be at the intermediate level. Rotation of the vane motor again ceases and the clutches 88 and 88' re-engage discs 86 and 86' to lock the motor.

Referring now to FIG. 2, a modification of the pneumatic servo system is shown. A housing 200 has a chamber 202 therein. Bellows 204 is fixed to housing 200 in chamber 202 and plate 206 is attached to the free end of bellows 204 to form chamber 208. Supply conduit 210 and branch conduit 211 lead to chamber 202 via branch conduit 212, plate 206 normally closing off communication between conduit 210 and chamber 202. Supply conduit 210 and branch conduit 211 also lead to chamber 208 via filter 214, fixed restriction 216 and branch conduit 218. Vent 220 also leads to chamber 202 via conduit 222, the null position of plate 206 normally closing off the connection between chamber 202 and conduit 222. In the null position of plate 206 the pressure in conduit 212 is higher than the pressure in chamber 202 and the pressure in chamber 202 is higher than the pressure in conduit 222. Thus there is a force tending to move plate 206 away from its null position and spring 224 extends from housing 200 to plate 206 to overcome this force and maintain plate 206 in its null position. The structure just described is duplicated on the opposite side of the servo housing and like parts are designated by like numbers with a prime superscript added.

The pressure level in conduits 211 and 211' downstream of fixed restrictions 216 and 216', and hence the pressure in branch conduits 218 and 218' and chambers 208 and 208' is regulated by flapper 226 which is pivoted at 227 to control the area of orifices 228 and 230.

Conduits 232 and 234 are connected to chambers 202 and 202', respectively, and the conduits communicate with gear motor 236 which has gears 236a and 236b therein. Motor 236 is like an ordinary gear pump but in the present application is utilized as a driven member and is powered by fluid passing through conduits 232 and 234 through the motor. Shaft 238 is attached to and driven by motor 236, and worm 240 is mounted on shaft 238. Gear 242 is driven by worm 240 and control drum 244 is mounted on gear shaft 246 connected to gear 242 to be rotated when the gear is driven by worm 240. Worm 240 and gear 242 are of the irreversible type so that the drive can only be through worm 240 to gear 242. Hence, when worm 240 is not driven by motor 236 it operates as a lock to prevent any undesired rotation of control drum 244.

An electrical signal is supplied to electromagnet or torque motor 248 to move flapper 226 and thereby ultimately reposition control drum 244 in a manner to be described below. A cam 250 mounted on shaft 246 varies the area of orifice 252 in conduit 254 to provide a position feedback signal to bellows 256. One end of bellows 256 is mounted on housing 258 and the free end of the bellows is attached to extension 260 of flapper 226. Pressure is supplied to bellows 256 via supply conduit 262, filter 264, branch supply conduit 266 which has a fixed restriction 268 therein and conduit 254. Bellows 270 is mounted on housing 258 and the free end thereof is also attached to flapper extension 260 to oppose bellows 256. A reference pressure is supplied to bellows 270 via conduits 272 and 274, conduit 274 connecting the interior of bellows 270 to conduit 272 at a point between fixed restrictions 276 and 278 in conduit 272. The conduit 272 also communicates with vent 220 at a point downstream of fixed restriction 278.

The servo system also incorporates a flow response feedback which consists of probe conduits 280 and 282 in conduit 232. Conduits 280 and 282 both lead to chamber and hence a complete flow circuit is established, and a fixed restriction 286 is positioned in one of the probe conduits to calibrate this feedback to obtain the desired effectiveness. Extension 260 of flapper 226 continues into chamber 284, and flow through chamber 284 imposes a load on extension 260 which tends to cause flapper 226 to move about pivot 227 in a manner to be described hereinafter.

*Operation of FIG. 2*

In the operation of the structure shown in FIG. 2, flapper 226 will ordinarily be in a null position and the pressure in conduits 218 and 218' and in chambers 208, 202, 208' and 202' will be at some intermediate value between the level of the supply pressure to conduits 211 and 211' and the vent 220. There will be no flow through conduits 232 and 234 and hence there will be no force to drive gear motor 236. Under these circumstances the irreversible nature of worm 240 and gear 242 operates as a lock to prevent any undesired rotation of control drum 244.

Assuming that the electrical signal delivered to electromagnet or torque motor 248 causes flapper 226 to move about pivot 227 in a clockwise direction, the area of orifice 228 will be decreased thereby increasing the pressure in conduit 211 downstream of fixed orifice 216, and the area of orifice 230 will be increased thereby decreasing the pressure in conduit 211' downstream of fixed orifice 216'. The increased pressure in conduit 211 will be transmitted via branch conduit 218 to chamber 208 to cause plate 206 to pivot about its contact with conduit 222 to open conduit 212 to chamber 202. The pressure in chamber 202 will start to increase and will continue to increase until it equals the pressure in chamber 208. The increasing pressure in chamber 202 tends to urge plate 206 to pivot in a clockwise direction about its contact with conduit 222 to close off conduit 212 from chamber 202. Thus an immediate feedback is present tending to restore plate 206 to its original position by the flow resultant on its being displaced from its original position.

At the same time that the above-described results are occurring, the reduced pressure in conduit 211' downstream of restriction 216' is transmitted to chamber 208' via branch conduit 218'. The reduction of pressure in chamber 208' results in plate 206' being rotated in a clockwise direction about its contact with conduit 212' thereby opening chamber 202' to vent 220 to reduce the pressure in chamber 202'. The pressure in chamber 202' will continue to reduce until it equals the pressure in chamber 208'. Once again the reduction of pressure in chamber 202' has an immediate feedback effect tending to cause plate 206' to return to its original position.

The increase in pressure in chamber 202 and the simultaneous decrease in pressure in chamber 202' causes a fluid flow from chamber 202 through conduit 232 through motor 236 and through conduit 234 to vented chamber 202'. The flow through motor 236 creates a differential pressure across the gears to cause gear 236a to rotate in a counterclockwise direction and to cause gear 236b to rotate in a clockwise direction. The rotation of one of the gears is transmitted via shaft 238 to worm 240 to overcome the locking effect of the irreversible worm and gear and rotate worm 240 and drive gear 242 to reposition control drum 244.

The supply pressure to conduit 262, substantially the same as in conduit 210, passes via conduit 272 and fixed orifices 276 and 278 therein to vent 220. A reference pressure is established between the orifices and this reference pressure is transmitted via branch conduit 274 to the interior of bellows 270. Simultaneously an opposing pressure is established in bellows 256 via branch conduit 266, fixed restriction 268 and conduit 254. Rotation of gear 242 moves contoured cam 250 to vary the area of orifice 252 thereby changing the pressure in bellows 256 to oppose the original movement of flapper 226 by a feedback of the angular position of gear 242 thereby tending to return flapper 226 to its null position. Under the present assumption that flapper 226 has been moved in a clockwise direction, cam 250 will be rotated in a manner to decrease the area of orifice 252 thereby increasing the pressure in chamber 258 to impose a load on extension 260 tending to rotate flapper 226 in a counterclockwise direction.

Another feedback is incorporated in the system which is responsive to flow in conduits 232 and 234 as distinguished from the above-described feedback which is responsive to the position of control drum 244. When, for example, fluid is flowing from chamber 202 to chamber 202' via conduits 232 and 234, probe conduit 282 senses total pressure in conduit 232 and probe conduit 280 senses static pressure in conduit 232. The difference between these pressures establishes a flow through chamber 284 which imposes a load proportional to the rate of flow on extension 260 tending to restore flapper 226 to its null position.

As flapper 226 returns toward its null position to equalize the pressures in conduits 211 and 211' downstream of the restrictions therein, the pressures in chambers 202 and 208 and in 202' and 208' become equalized, and the plates 206 and 206' return to their null position. Flow through conduit 232, pump 236 and conduit 234 ceases and the pressure in all of the chambers once again assumes some intermediate value between the supply pressure and the vent pressure. The rotation of the gears in pump 236 then ceases and worm 240 and gear 242 become locked to prevent any undesired rotation of control drum 244.

It will be apparent that if flapper 226 is actuated by electromagnet 248 to rotate in a counterclockwise direction about pivot 227, the operation of the servo system will be reversed. The pressure in chambers 208 and 202 will be decreased while the pressure in chambers 208' and 202' will be increased so that a flow will be established from chamber 202' through conduit 234, pump 236 and conduit 232 to vented chamber 202. The flow through pump 236 will then cause gear 236a to rotate in a clockwise direction and gear 236b to rotate in a counterclockwise direction to drive worm 240 and gear 242 and rotate control drum 244 in a direction opposite to the direction of rotation previously obtained. The inherent feedback action of plates 206 and 206', will again occur as previously described as will the position feedback and flow response feedback acting on extension 260 of flapper 226. However, this time cam 246 will be rotated to increase the area of orifice 252 thereby decreasing the pressure in bellows 256 and hence reducing the opposition to bellows 270 thus imposing a clockwise force on extension 260. Likewise, probe conduit 280 will now sense total pressure in conduit 232 and probe conduit 282 will sense static pressure in conduit 232 and a flow will be established through chamber 284 to impose a load on extension 260 tending to rotate flapper 226 in a clockwise direction.

It is to be understood that the invention is not limited to the specific embodiment herein illustrated and described but may be used in other ways without departure from its spirit as defined by the following claims.

I claim:

1. In a servo system, a conduit, a servo supply, connected to said conduit means for varying said servo supply including valve means positioned in a chamber to regulate flow through said conduit, motor means, locking means connected to said conduit operatively connected to said motor means for restraining movement of said motor means, means responsive to variations in said servo supply for releasing said locking means and actuating said motor means, feedback means responsive to pressure in said chamber acting on said valve means and additional feedback means responsive to flow in said conduit acting upon said servo supply varying means.

2. In a servo system, a chamber, pressure responsive means in said chamber, a first pressure supply connected to said chamber, said first pressure supply being shut off from said chamber by said pressure responsive means, means including a second pressure supply and means for varying said second pressure supply for supplying a variable pressure to said pressure responsive means to open said first pressure supply to said chamber until the pressure therein is substantially equal to said variable pressure, a conduit connected to said chamber, and feedback means from said conduit to said means for varying said second pressure supply, said feedback means including means for sensing the total pressure in said conduit, means for sensing the static pressure in said conduit, and means for imposing the difference between said total and static pressures on said means for varying said second pressure supply.

3. In a servo system, first and second chambers, conduit means connecting said chambers, first pressure supply and vent means connected to said chambers, pressure responsive means in said chambers, said pressure responsive means in one position shutting off said pressure supply and said vent from said chambers, means including a second pressure supply and means for varying said second pressure supply for supplying variable pressures to the pressure responsive means in each chamber to open said first pressure supply to one of said chambers and to open said vent means to the other of said chambers until the pressure in each chamber is substantially equal to the pressure delivered to the pressure responsive means in each chamber, and feedback means from said conduit to said varying means, said feedback means being responsive to flow in said conduit.

4. In a servo system, first and second chambers, conduit means connecting said chambers, first pressure supply and vent means connected to said chambers, pressure responsive means in said chambers, said pressure responsive means in one position shutting off said pressure supply and said vent from said chambers, means including a second pressure supply and means for varying said second pressure supply for supplying variable pressures to the pressure responsive means in each chamber to open said first pressure supply to one of said chambers and to open said vent means to the other of said chambers until the pressure in each chamber is substantially equal to the pressure delivered to the pressure responsive means in each chamber, and feedback means from said conduit to said varying means, said feedback means being responsive to flow in said conduit including means for sensing the total pressure in said conduit, means for sensing the static pressure in said conduit, and means for imposing the difference between said total and static pressures on said varying means.

5. In a servo system, a conduit, signal responsive means for establishing a flow in said conduit, and feedback means from conduit to said signal responsive means, said feedback means being responsive to the rate of flow in said conduit and wherein said signal responsive means includes a pressure source, a chamber connected to and positioned between said conduit and said pressure source, and a flapper valve positionable to regulate flow from said pressure source and into said chamber and conduit and wherein the pressure in said chamber imposes a feedback force upon said flapper valve.

6. In a servo system, a conduit, signal responsive means for establishing a flow in said conduit, and feedback means from conduit to said signal responsive means, said feedback means being responsive to the rate of flow in said conduit, and wherein said signal responsive means includes a first and second chamber located between said pressure source and said conduit, a first flapper valve positioned to control flow between said pressure source and said first chamber and to thereby regulate the pressure in said first chamber and so that the pressure in said first chamber imposes a feedback force upon said first flapper valve, a second flapper valve positioned between said pressure source and said second chamber and responsive to said pressure in said first chamber to regulate the flow of fluid from said pressure source to said second chamber and so that the pressure in said second chamber imposes a feedback force upon said second flapper valve.

7. In a servo system, a conduit, a chamber, signal responsive means including a flapper valve for establishing a primary flow in said conduit and having an end extending into said chamber, and feedback means including first means for sensing the total pressure in said conduit and second means for sensing the static pressure in said conduit, said first and second means communicating with said chamber to establish a secondary flow therethrough proportional to said primary flow, said secondary flow acting upon said flapper valve end to impose a feedback force thereon proportional to said secondary flow and hence said primary flow.

References Cited in the file of this patent

UNITED STATES PATENTS

| 750,752 | Cole | Jan. 26, 1904 |
| 1,014,830 | Lloyd | Jan. 16, 1912 |
| 1,547,269 | Spencer | July 28, 1925 |
| 2,654,348 | Beck | Oct. 6, 1953 |
| 2,939,430 | Westbury | June 7, 1960 |
| 2,972,338 | Lloyd | Feb. 21, 1961 |
| 2,979,034 | Geyer | Apr. 11, 1961 |
| 3,038,498 | Seavey | July 12, 1962 |

FOREIGN PATENTS

| 447,565 | Germany | July 31, 1926 |